Aug. 7, 1934.  L. D. MANNES ET AL  1,969,469
PHOTOGRAPHIC COLOR PROCESS
Filed July 30, 1932
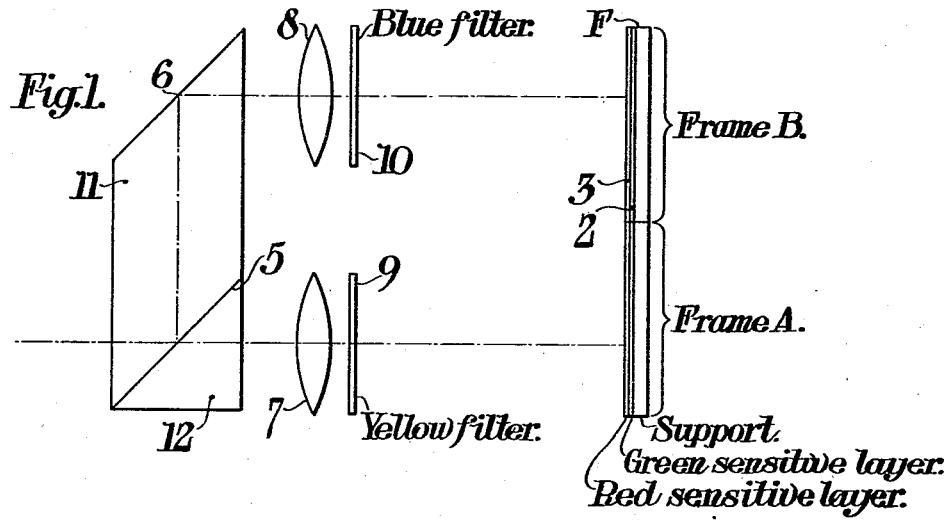
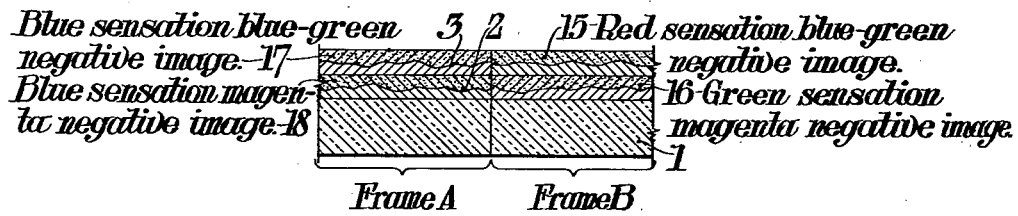
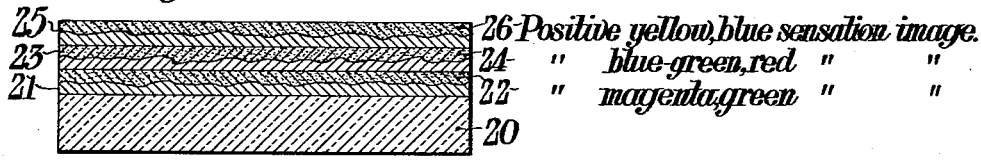
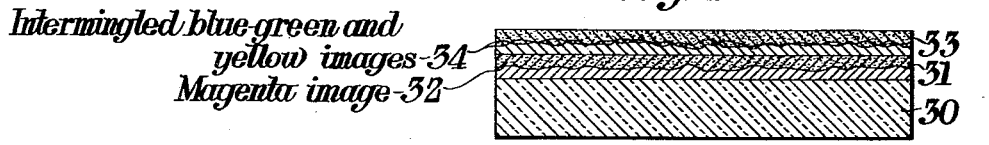
Inventors:
Leopold D. Mannes &
Leopold Godowsky, Jr.,
By Newton M. Perrins
Attorney.

Patented Aug. 7, 1934

1,969,469

UNITED STATES PATENT OFFICE 1,969,469

PHOTOGRAPHIC COLOR PROCESS

Leopold D. Mannes and Leopold Godowsky, Jr., Rochester, N. Y.

Application July 30, 1932, Serial No. 626,734

4 Claims. (Cl. 95—2)

This invention relates to three-color photography and particularly to a process adapted for motion picture purposes. It comprises a process wherein there is used in the camera a film having two differentially colored sensitized layers which are exposed simultaneously to two images of the same subject, one area by a blue light and the other by a mixed green and red light. The resultant negative includes in one area and in two different layers differently colored color sensation images and in another area and in each layer differently colored images of a third color sensation record. From this negative, there is produced by double printing upon the same area of a positive film three component images which are differentially treated to produce three differently colored images in registry, which, when projected, produce by a subtractive process a correctly colored image of the original subject.

Referring to the accompanying drawing, Fig. 1 shows diagrammatically the optical arrangement of a camera preferably employed to carry out my improved process. Fig. 2 shows upon an enlarged scale and diagrammatically a section of the finished negative. Fig. 3 shows a similar figure of one form of the finished positive film and Fig. 4 shows similarly a different form of the finished product.

The process involves novel steps in making the negative, a novel negative, and in printing therefrom upon a positive material. The process as a whole constitutes a novel and practicable method and includes various new features useful in themselves.

The film is exposed in a camera of the split beam type which exposes two adjacent frames simultaneously to the same light image. Such a suitable camera is illustrated diagrammatically in Fig. 1. Light from the subject is transmitted by the special optical system to the film as shown. A rhomb 11 of optical glass has cemented to one face a glass prism 12 which is partially silvered along the face 5, being either of the semi-transparent type or having transmitting or reflecting areas. The face 6 of the rhomb is completely silvered. As indicated by the diagram, this system will give rise to two images, one through the face 5 and one from the face 6 which are transmitted by lenses 7 and 8 through corresponding filters 9 and 10 to the two frames A and B of the negative film F. In the ensuing description we shall call any simultaneously exposed pair of frames A and B respectively. It is understood that any color selection camera of familiar type may be used and that the exposure of successive frames may be consecutively instead of simultaneously.

In the path of the beam falling on frame A is a sharp cutting yellow filter 9 of well known type absorbing practically all the blue light, and transmitting red and green light. As the red sensitive coating 3 of the negative film is practically insensitive to light between 510–590 m$\mu$ it will record through the yellow filter only the red light component of a tri-color system. The lower green sensitive layer 2 will correspondingly record only the green component ranging from approximately 510–590 m$\mu$. Owing to the relatively larger exposure required for obtaining two correct differential color component records on frame A as described, the partial reflecting surface 5 in front of lens 7 should transmit considerably more than one-half the incident light directly to frame A, say 70–80%. The remainder of the incident light is reflected to the surface 6 in front of lens 8 which, in turn, reflects it fully through lens 8 and through a blue filter 10 absorbing red and yellow. Owing to the natural blue sensitivity of both emulsion layers, frame B will contain the blue component record of the tri-color system recorded in both emulsion layers substantially without any differential action. As the blue sensitivity of these rapid emulsions is very high, full exposure may be obtained using only a relatively small percentage of the total light reflected from the subject photographed. The ratio of exposure of frames A and B will naturally be altered according to the source of illumination and other requirements of the materials actually employed.

As the camera mechanism (not shown) pulls down two frames at a time for each exposure, double the normal length of film is used.

The film is now processed by differential treatment of the two layers, as for instance, by one of the processes described in our Patents 1,516,824, granted November 25, 1924, and 1,659,148, granted Feb. 15, 1928, or in our copending applications Serial No. 531,356, filed January 24, 1922 and No. 232,735, filed November 12, 1927, the process being such that the resulting images in the respective layers are magenta and blue-green.

This film will now have images as shown in Fig. 2 wherein in frame A there is present in the lower layer 2, the green sensation record in the form of a negative color or dye image 16 colored magenta or minus green, and in the upper layer 3 the red sensation record in the form of a dye image 15 colored blue green or minus red. Blue sensation record images 17 and 18 are found in the two layers colored blue green in the upper layer and magenta in the lower layer.

The negative red and green sensation images 15 and 16 are then printed, preferably by projection, upon a positive film of the same general type. A single beam of red and green light comprises the printing beam and impresses the layers of the positive film, the resulting latent images being transformed by the known processes referred to above into images of magenta and blue green, the magenta image as before being in the outer or red sensitive layer and the blue-green image in the lower layer.

It is obvious that in printing motion picture film a printer will be used which will pull down the negative film two frames and the positive film one frame at each operation and that alternate frames will thus be projected from the negative.

The film is then either resensitized or recoated with a sensitive emulsion and the blue component images printed in registration upon the same areas and developed or transformed by known processes, such as color forming developer, into a yellow image. The printing light may be either red or green or a mixture. Another way in which the blue sensation record may be added is by forming by well known methods a gelatine relief image corresponding to it and printing from this by imbibition a yellow dye image in registration in the layer containing the other images.

The resulting three-color print, if the yellow image is made in a recoated sensitized layer, is indicated in Fig. 3, where the support, designated 20, carries a first layer 21, originally green sensitive, carrying a positive, green sensation record image 22 colored magenta, a second layer 23, originally red sensitive, carrying a positive, red sensation record 24 colored blue green, and a third layer 25 applied by recoating and carrying a blue sensation record image 26 colored yellow.

If the yellow image is applied by imbibition or by a method involving resensitizing the final positive image will be as indicated in Fig. 4, when the support designated 30, carries a first layer 31 containing a magenta image 32, over which is a second layer 33 containing intermingling images designated 34 as a whole and colored blue-green and yellow.

What I claim as new and desire to be secured by Letters Patent is:

1. In a process of producing a photographic record representing three different color sensations, the step which comprises exposing from the same side two areas of a film coated with two blue sensitive layers in superposition, one layer being also sensitive to green but not to red, and the other being also sensitive to red but not to green, one area only being exposed through a yellow filter, thereby recording the red record in one layer and the green record in the other layer of said area, and the other area being exposed through a blue filter, thereby recording the blue record in both layers of said other area.

2. In a process of producing a photographic record representing three different color sensations, the steps which comprise exposing from the same side two areas of a film coated with two blue sensitive layers in superposition, one layer being also sensitive to green but not to red, and the other being also sensitive to red but not to green, one area only being exposed through a yellow filter, thereby recording the red record in one layer and the green record in the other layer of said area, and the other area being exposed through a blue filter, thereby recording the blue record in both layers of said other area and then developing said layers by different processes to produce differently colored images therein, and then printing from the red and green color records by differentially colored lights upon differentially sensitive layers upon the same area of a sensitive film, and by a separate operation printing from the blue record images upon the same area of the last named sensitive film.

3. The process of producing a three-color photographic record which comprises forming in one area of two differentially color sensitized layers in superposition two registering latent images of the same subject, one in each layer, the images being different color sensation records thereof, and forming in each layer of another area of the same element a latent image, a third different color sensation record of the same subject, subjecting the two layers to different treatment and transforming the images therein into images of different color and then forming on a common area of another photographic element three registering differently colored images corresponding respectively to each of the three original color component records.

4. The process of producing a three-color photographic record which comprises forming in one area of two differentially color sensitized layers in superposition two registering latent images of the same subject, one in each layer, the images being different color sensation records thereof, and forming in each layer of another area of the same element a latent image, a third different color sensation record of the same subject, subjecting the two layers to different treatment and transforming the images therein into images of different color and then forming in three layers on a common area of a photographic element three registering differently colored images, one in each layer, corresponding respectively to each of the three original records.

LEOPOLD D. MANNES.
LEOPOLD GODOWSKY, Jr.